United States Patent [19]

Di Tria

[11] 4,380,081
[45] Apr. 12, 1983

[54] DIGITAL RECEIVER FOR FOUR-PHASE-MODULATED CARRIER

[75] Inventor: Paolo Di Tria, Turin, Italy

[73] Assignee: Cselt - Centro Studi e Laboratori Telecomunicazioni S.p.A., Turin, Italy

[21] Appl. No.: 290,501

[22] Filed: Aug. 6, 1981

[30] Foreign Application Priority Data

Aug. 7, 1980 [IT] Italy .................. 68262 A/80

[51] Int. Cl.³ .............................................. H03D 3/22
[52] U.S. Cl. ....................................... 375/82; 375/86; 307/518
[58] Field of Search ................. 375/39, 53, 54, 82, 375/86, 95, 110, 119; 360/40, 42, 51; 340/825.70; 329/110, 126; 307/518, 527, 528

[56] References Cited

U.S. PATENT DOCUMENTS

| 3,721,906 | 3/1973 | Geesen et al. | 307/518 |
| 3,938,052 | 2/1976 | Glasson et al. | 375/82 |
| 4,276,650 | 6/1981 | Jager et al. | 375/86 |

Primary Examiner—Benedict V. Safourek
Attorney, Agent, or Firm—Karl F. Ross

[57] ABSTRACT

A signal receiver at the subscriber end or the exchange end of a telephone line loop, over which messages are transmitted in digitized form by a carrier with four possible phase positions representing as many two-bit combinations or dibits, includes a coherent phase demodulator in which samples of the incoming carrier (converted to a square wave) are logically multiplied with coincident samples of a locally generated reference wave of like or subharmonically related frequency to produce a binary sequence of a configuration depending upon the relative phase. A multiplicity of samples of that sequence, encompassing two cycles of the reference wave, pass through a corresponding number of stages of a shift register; two interleaved groups of nonadjacent stages of this shift register are connected on the one hand to a decision circuit, designed to recognize the dibit represented by the current carrier phase, and on the other hand to respective coincidence circuits of a time base determining the exact instance when the contents of the shift register are to be read by the decision circuit. A phase-locking circuit is connected to a further group of register stages in order to detect spurious phase shifts and to make compensatory adjustments in the phasing of the locally generated reference wave. The receiver forms part of a modem whose transmitting section operates with an outgoing carrier of a frequency harmonically related to that of the incoming carrier.

12 Claims, 6 Drawing Figures

DIGITAL RECEIVER FOR FOUR-PHASE-MODULATED CARRIER

FIELD OF THE INVENTION

My present invention relates to a digital receiver designed to demodulate an incoming carrier wave subjected at a transmitting end to four-phase modulation.

BACKGROUND OF THE INVENTION

The term "four-phase modulation" is used in the telecommunication art to describe a technique by which a sinusoidal carrier wave is selectively shifted into any of four possible phase positions relative to a reference wave of the same or a subharmonically related frequency. These phase positions represent respective pairs of consecutive bits of a data word, known as dibits, which can be decoded at a receiver by coherent phase demodulation involving a comparison with a reference wave in step with that used at the transmitter. The phase-modulated carrier can be regarded as the sum of a cosine wave and a sine wave of like frequency and of amplitudes of the same unit value ±1; by combining a cosine wave in phase with the reference wave and a sine wave in quadrature therewith, the resulting carrier will be phase-shifted by selective inversions of the sign of either or both constituent waves. Thus, the logical values of the first and second bits of a dibit may be respectively represented by the signs of the cosine component and the sine component, for example; conventionally, phase positions in the first, second, third and fourth quadrants (45°, 135°, 225° and 315°) may denote the bit pairs 11, 10, 00 and 01, respectively. The actual synthesis of the carrier at the transmitting end may be performed digitally with the aid of predetermined filter coefficients by which instantaneous samples of the cosine and sine components are logically multiplied before being added together; a circuit arrangement performing these operations is disclosed in commonly owned U.S. application Ser. No. 100,908, filed Dec. 6, 1979 in the names of Francesco Gandini et al as a continuation of an earlier application, Ser. No. 902,164, filed May 2, 1978.

The use of four-phase modulation is particularly advantageous in a telephone system in which it is desired to transmit data at high speed among participating subscribers, e.g. digital speech at 64 Kbit/sec., signalization and synchronization messages at 16 Kbit/sec., or slow video signals. Full-duplex data transmission over a two-way signal path is possible with the aid of two carriers of different frequencies. The need may occasionally arise for interchanging the transmitting and receiving frequencies since the high-frequency channel is subjected to greater attenuation whereas the lower frequency channel may be affected by a more pronounced amplitude dissymmetry. Also, a given terminal may receive carriers of higher and lower frequency from different signal links.

OBJECTS OF THE INVENTION

An important object of my present invention is to provide means in a receiver of four-phase-modulated carrier waves for insuring their efficient coherent demodulation without the need for a separate transmission of the reference wave used at the transmitting end.

Another object is to provide a demodulator for this purpose which can be used practically unchanged for several harmonically related carrier frequencies available for two-way transmission.

SUMMARY OF THE INVENTION

A receiver according to my present invention comprises a squarer which converts an incoming carrier wave into a phase-modulated square wave, a generator of a reference square wave having a frequency harmonically related to that of the incoming carrier wave, phase-modulation means with inputs connected to the squarer and to the reference-wave generator for emitting a binary sequence of a configuration determined by the relative phasing of the two squarer waves, and a source of timing pulses controlling the operation of that generator, these timing pulses having a cadence equal to a multiple of the frequency of the reference square wave. A shift register connected to the phase-demodulation means receives samples of the binary sequence issuing therefrom, these samples being taken upon the occurrence of the timing pulses and being loaded into respective stages of the shift register which is stepped by the same pulses; the number of register stages is sufficient to accommodate samples representing at least one full cycle and preferably two cycles of the reference square wave. Logic circuitry connected to the source of timing pulses and to at least some of the stage outputs of the shift register generates a reading command upon detecting certain characteristic bit groupings in the corresponding register stages which indicate optimum instants for reading the contents of the register; these stage outputs are further connected to decision means emitting a decoded dibit in response to the reading command.

According to another feature of my invention, certain stage outputs of the shift register are connected to phase-locking means controlled by the reading command for recognizing predetermined bit groupings other than these referred to above which are indicative of spurious phase shifts, the phase-locking means delivering in that instance corrective signals to the timing-pulse source for correspondingly readjusting the operation of the reference-wave generator.

The sampling of the binary sequence to be loaded into the shift register advantageously takes place at the squarer and at the reference-wave generator, thus upstream of the demodulation means which may be constituted by an Exclusive-OR gate.

BRIEF DESCRIPTION OF THE DRAWING

The above and other features of my invention will now be described in detail with reference to the accompanying drawing in which.

SPECIFIC DESCRIPTION

Figure 1:
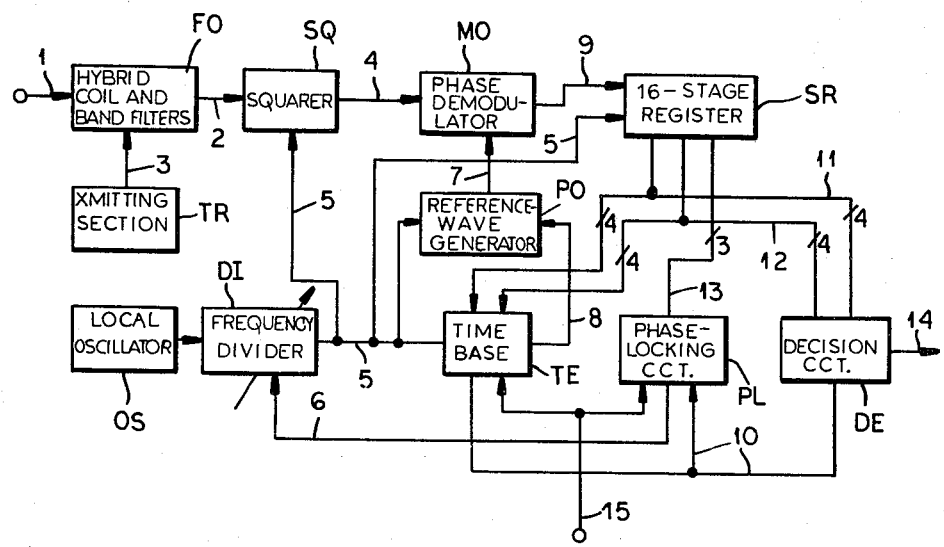
FIG. 1 is a block diagram of a receiver according to my invention designed to demodulate four-phase-modulated carrier waves.

FIG. 1 shows a transmit/receive modem at a terminal of a telecommunication system connected to a remote station via a two-way signal path 1 such as a line loop of a telephone system. This signal path terminates at a coupling network FO, including a hybrid coil and the usual band-pass filters, which forwards outgoing carrier waves from an output load 3 of a transmitting section TR and feeds incoming carrier waves by way of a lead 2 to a squarer SQ forming part of a receiving section. The transmitting section TR, which may be of conventional design, is assumed to be identical with a similar section at the remote station in which the incoming carrier is phase modulated in the aforedescribed manner to convey a succession of dibits forming part of 10-bit data words, for example. This corresponds to a recurrence rate or Baud frequency of 40 kHz for the dibits if each data word is allotted a time slot of 125 μsec. Carriers modulated with these dibits by the four-phase technique, transmitted in two directions over signal path 1, may have respective frequencies of 80 and 240 kHz.

The squarer SQ converts the incoming sinusoidal carrier into a binary square wave in which amplitude peaks of opposite polarities are respectively translated into a high and low voltage. The resulting square wave is sampled by timing pulses on an output lead 5 of a clock circuit comprising a crystal-controlled local high-frequency oscillator OS working into a programmable frequency divider DI whose step-down ratio can be adjusted up or down by a corrective signal delivered to a control input thereof by an output lead 6 of a phase-locking circuit PL. The square-wave samples are fed on a lead 4 to one input of a phase demodulator MO, advantageously constituted by an Exclusive-OR (EX-OR) gate, to which a reference square wave is delivered by an output lead 7 of a local generator PO also controlled by the timing pulses on lead 5. The same timing pulses, assumed to have a cadence of 16 times the Baud frequency (i.e. 640 kHz), are supplied to a time base TE and to a stepping input of a 16-stage shift register SR whose loading input is connected to an output lead 9 of phase demodulator MO. An output lead 8 of time base TE extends to generator PO for changing its phase under conditions and in a manner described hereinafter. Another output lead 10 of time base TE terminates at phase-locking circuit PL as well as at a decision circuit DE which, in response to a reading command from that time base, detects the dibits conveyed by the incoming carrier wave and sequentially emits the bits of each pair on a lead 14. Shift register SR is provided for this purpose with a number of stage outputs connected to two four-lead multiples 11 and 12 which extend on the one hand to decision circuit DE and on the other hand to time base TE; a three-lead multiple 13 connects respective stages of register SR to circuit PL. A control lead 15, carrying a binary discriminating signal, extends to time base TE and may also have a branch connected to phase-locking circuit PL as indicated in phantom lines; the discriminating signal, designed to inform the receiver whether a low-frequency carrier of 80 kHz or a high-frequency carrier of 240 kHz is to be demodulated, may be manually generated by a nonillustrated selector switch.

Figure 5:
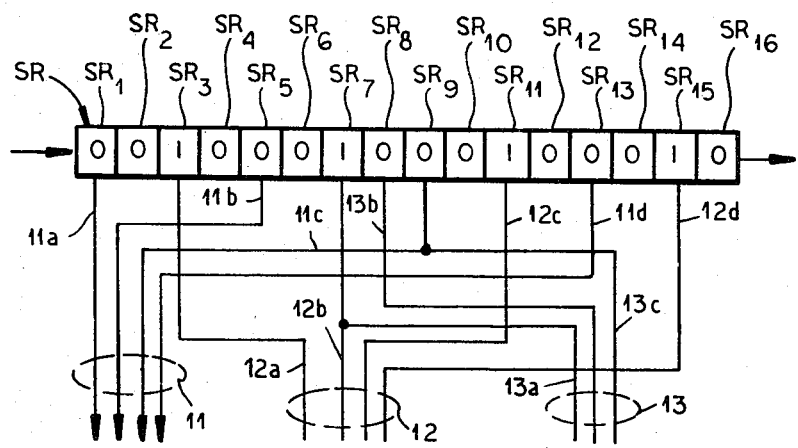
FIG. 5 is a diagram showing the output connections of a shift register included in the receiver of FIG. 1.

In FIG. 5 I have shown the shift register SR in greater detail, along with the logical values of 16 samples stored at a particular instant in its stages $SR_1$–$SR_{16}$. The four leads 11a, 11b, 11c, 11d of multiple 11 are shown connected to a first group of nonadjacent stages $SR_1$, $SR_5$, $SR_9$ and $SR_{13}$ whereas the four leads 12a, 12b, 12c and 12d of multiple 12 are connected to a second group of nonadjacent stages $SR_3$, $SR_7$, $SR_{11}$ and $SR_{15}$ interleaved with the first group. Moreover, stages $SR_7$, $SR_8$ and $SR_9$ are connected to respective leads 13a, 13b and 13c of multiple 13.

Figure 2:
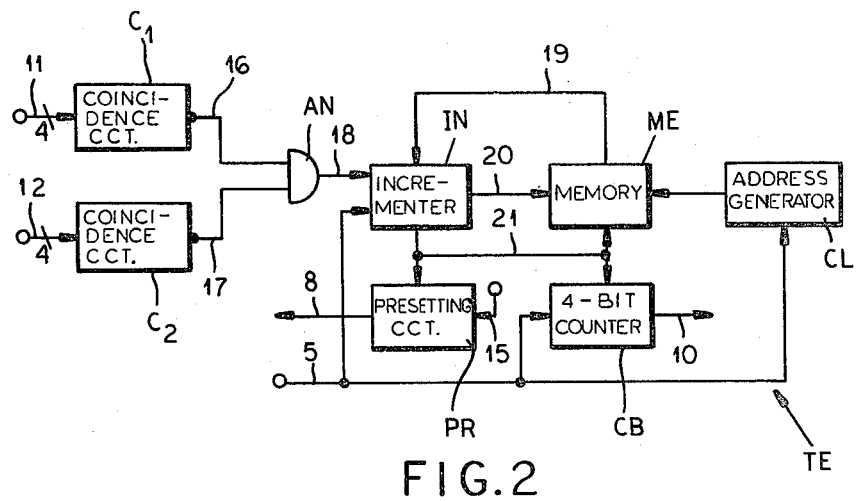
FIGS. 2, 3 and 4 show details of certain blocks depicted in FIG. 1.

According to FIG. 2, which shows details of time base TE, the two multiples 11 and 12 terminate at respective coincidence circuits $C_1$ and $C_2$ designed as respective EX-OR gates with negated outputs 16 and 17 extending to an AND gate AN. The output 18 of the latter is connected to a loading output of an incrementer IN which is clocked by timing pulses on lead 5 and is connected in a loop with a 16-cell memory ME via a feed-forward lead 20 and a feedback lead 19. Memory ME is addressed by a circuit CL also stepped by the timing pulses on lead 5, these pulses being further applied to a stepping input of a four-bit counter CB which measures dibit cycle of 16 timing pulses; Baud counter CB periodically energizes the lead 10 terminating at components TE and DE of FIG. 1. The discriminating signal on lead 15 reaches a presetting circuit PR whose output is the lead 8 which extends to reference-wave generator PO as also shown in FIG. 1.

Figure 3:
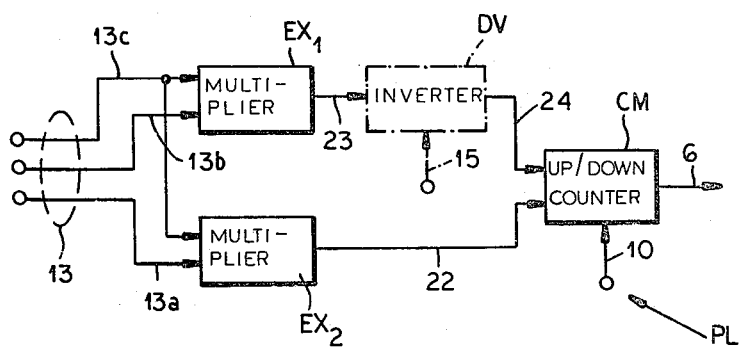

The phase-locking circuit PL is seen in FIG. 3 to comprise two multipliers $EX_1$ and $EX_2$, also designed as EX-OR gates. Two inputs of multiplier $EX_1$ are connected to leads 13b and 13c of multiple 13 whose third lead 13a is connected to multiplier $EX_2$ along with a branch of lead 13c. The output 23 of multiplier $EX_1$ is tied to a control input 24 of an up/down counter CM which has a stepping input connected to the output 22 of multiplier $EX_2$ and an enabling input connected to lead 10; the output of this counter is the lead 6 terminating in FIG. 1 at the control input of frequency divider DI. An inverter DV, controlled by the discriminating signal on lead 15, may be inserted between the multiplier output 23 and the counter input 24 as indicated in phantom lines.

Figure 4:
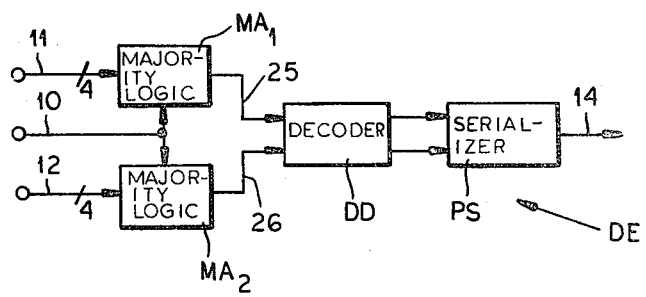

FIG. 4 shows the decision circuit DE as comprising two majority-logic networks $MA_1$ and $MA_2$ each having four inputs connected to respective leads of multiplier 11 or 12, these networks further having enabling inputs connected to lead 10. Their outputs 25 and 26 extend to a decoder DD which detects the dibit extracted from shift register SR (FIG. 1) and feeds the two bits thereof to a serializer PS emitting them on output lead 14.

Figure 6:
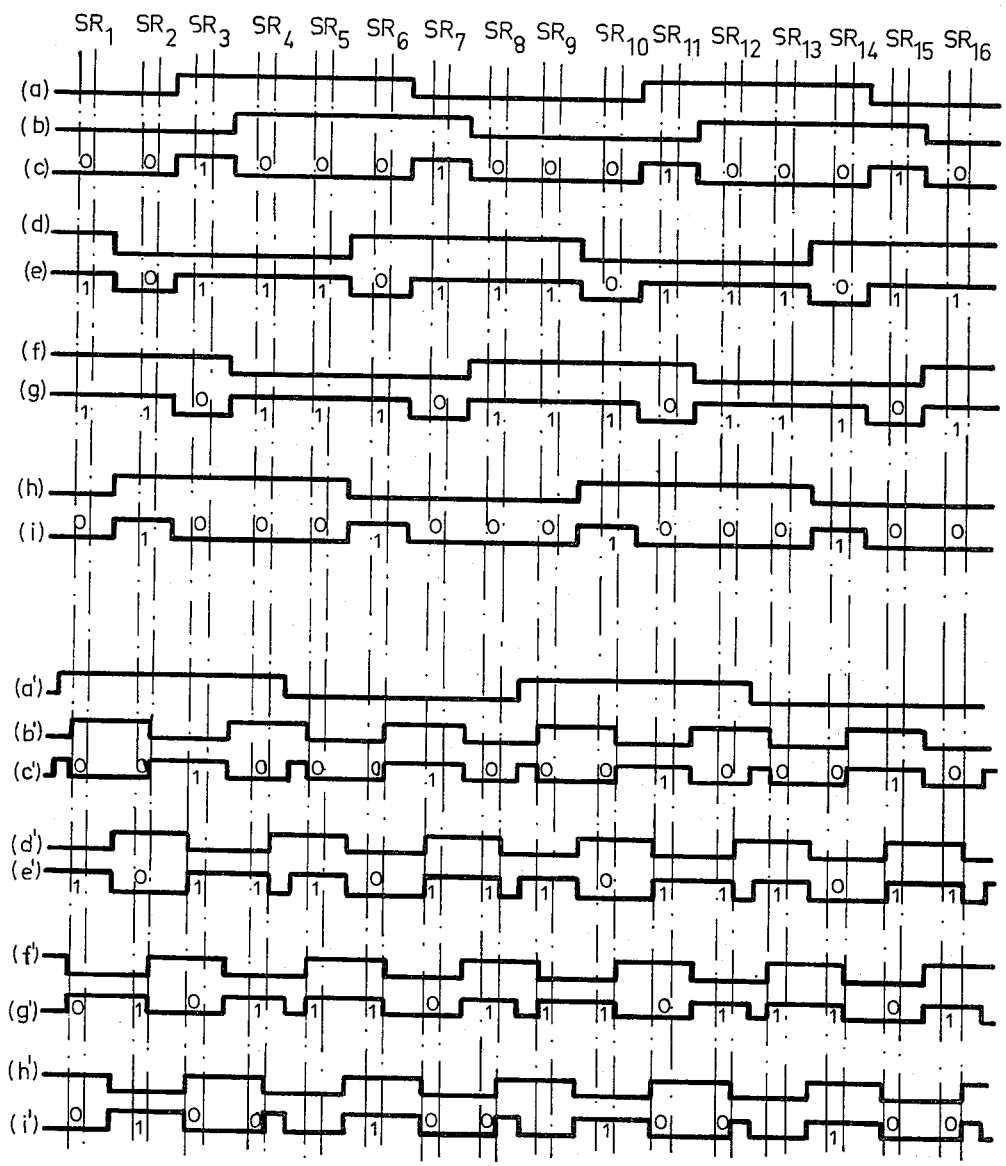
FIG. 6 is a set of graphs relating to the operation of the receiver.

I shall now describe the operation of the receiver of FIG. 1 with reference to FIG. 6 whose first nine graphs (a)–(i) relate to the demodulation of a four-phase-modulated low-frequency carrier of 80 kHz while its remaining graphs (a')–(i') have the same significance in conjunction with a high-frequency carrier of 240 kHz.

Graph (a) represents the reference wave emitted by generator PO which graphs (b), (d), (f) and (h) show a square wave derived from the incoming carrier with leading phases of 45°, 135°, 225° and 315°, respectively; the remaining graphs (c), (e), (g) and (i) of this group show the voltage differences between the reference wave and the incoming carrier. Since, however, both the carrier and the reference wave are sampled in the rhythm of the timing pulses on lead 5, only intermittent segments of the waveforms shown in these graphs will actually come into existence. These waveform segments, corresponding to samples loaded into the stages of shift register SR, lie between pairs of vertical lines marked with the corresponding stage designations $SR_1$–$SR_{16}$.

The bits indicated in graphs (c), (e), (g) and (i) represent the contents of every stage at an instant when 16 samples of a complete dibit are loaded into the shift register SR. It will be noted that at such instants, in any phase position of the carrier, the stages of each group contain identical bits, namely 0/1 in graph (c), 1/1 in graph (e), 1/0 in graph (g) and 0/0 in graph (i). These characteristic bit groupings, indicating an optimum readout time, are detected by the inverting EX-OR gates of coincidence circuits $C_1$ and $C_2$ in FIG. 2 whose simultaneous conduction energizes the output lead 18 of AND gate AN whereby the amount stored in the concurrently addressed call of memory ME is increased by the incrementer IN. If mutually identical bits again appear in the stages of each group at 16-pulse intervals, i.e. when the same memory cell is being addressed, the contents of that cell will eventually reach a predetermined threshold; incrementer IN then emits on its output lead 21 an alignment signal which clears the memory ME as well as the presetting circuit PR and the Baud counter CB. From that point on, counter CB sends a reading command once per dibit cycle on its output lead 10 to the counter CM of phase-locking circuit PL (FIG. 3) and to the logic networks $MA_1$, $MA_2$ of decision circuit DE (FIG. 4). These reading commands mark the optimum instants for the extraction of the contents of the odd-numbered stages of shift register SR. Logic networks $MA_1$ and $MA_2$ then emit bits on their outputs 25 and 26 which correspond to the contents of the majority of the register stages in the respctive group connected thereto; if these contents happen to be two 0's and two 1's, the bits from the centrally located stages of the respective group will be selected since these stages are least susceptible to noise or line jitter. The voltages on leads 25 and 26 are translated by decoder DD, according to the code employed, into a bit pair sequentially emitted by serializer PS.

If the carrier to be demodulated has the higher frequency of 240 kHz, the same bit combinations as in the preceding instances will be read out for like phases of that carrier provided that the reference wave is shifted as indicated in graph (a'). For this purpose, the presetting circuit PR of FIG. 2 responds to the discriminating signal on lead 15 by emitting a phase-shifting command to generator PO (FIG. 1) via lead 8.

When the phase shift of the carrier relative to the reference wave of graph (a) or (a') is such that the bits entered in the first group of register stages $SR_1$, $SR_5$ etc. are different from those entered in the second group of stages $SR_3$, $SR_7$ etc., the middle stage $SR_8$ will lie between two stages of different bit values as seen in graphs (c), (c'), (g), (g'). In that case the sample entered in stage $SR_8$ is taken in the vicinity of a zero crossing of the incoming carrier so that the bit stored in that stage does not necessarily have the values shown in these graphs but may alternate between 0 and 1 in response to minor relative phase shifts between the carrier and the reference wave. I utilize this phenomenon, in accordance with a feature of my invention, for modifying the step-down ratio of divider DI (FIG. 1) to the extent necessary in order to re-establish the correct relative phasing of the reference wave and the carrier. Thus, as shown in FIG. 3, the EX-OR gate of multiplier $EX_1$ will energize its output 22 whenever the voltages of leads 13a and 13c are different from each other, thereby stepping the counter CM either up or down; the stepping direction is determined by the output 23 of multiplier $EX_1$ which is low when the bits in stages $SR_8$ and $SR_9$ are identical—as actually illustrated in the graphs referred to—but is high when the voltages on leads 13b and 13c are unequal. In the first instance, the contents of counter CM are incremented in a sense tending to shift the reference wave of graph (a) or (a') to the right; in the second instance the contents of the counter are correspondingly decremented in the sense of a leftward shift. A command temporarily increasing or decreasing the step-down ratio of divider DI (FIG. 1) to this effect is emitted only when the count of component CM reaches a certain upper or lower limit; as long as the relative phase of the carrier in the positions of the aforementioned graphs does not vary significantly in one direction or the other, the operation of the divider is not modified. In the event of a spurious phase shift, however, corrective action is taken by the phase-locking circuit PL so that demodulation continues to be carried out in a virtually coherent manner.

The inverter DV indicated in phantom lines in FIG. 3 will be needed under circumstances when, contrary to what is shown in FIG. 6, a spurious phase shift of the high-frequency carrier requires a corrective action opposite that needed for the lower-frequency carrier. Such a situation could occur, for example, when the reference wave in graph (a') retained the position of graph (a) upon a changeover to the 240-kHz carrier.

I claim:

1. A receiver of phase-modulated carrier waves arriving over a signal path of a telecommunication system in any of four possible phase positions representing dibits of transmitted data words,
    comprising:
    a squarer converting an incoming carrier wave into a phase-modulated square wave;
    a generator of a reference square wave having a frequency harmonically related to that of the incoming carrier wave;
    phase-demodulation means with inputs connected to said squarer and to said generator for emitting a binary sequence of a configuration determined by the relative phasing of said phase-modulated square wave and said reference square wave;
    a source of timing pulses controlling the operation of said generator, said timing pulses having a cadence equal to a multiple of the frequency of said reference square wave;
    a shift register connected to said phase-demodulation means for receiving therefrom samples of said binary sequence which are taken upon the occurrence of said timing pulses, said shift register being stepped by said timing pulses and having a multiplicity of stages accommodating a number of said samples representing at least one full cycle of said reference square wave;
    logic circuitry connected to said source and to stage outputs of said shift register for detecting characteristic bit groupings appearing in said stages, indicative of optimum instants for reading the contents of said shift register, said logic circuitry generating a reading command at said optimum instants; and
    decision means connected to said stage outputs and responsive to said reading command for emitting a dibit decoded from said contents.

2. A receiver as defined in claim 1, further comprising phase-locking means connected to certain of said stage outputs and controlled by said reading command for recognizing predetermined bit groupings indicative of spurious phase shifts and delivering corrective signals to said source for correspondingly readjusting the operation of said generator.

3. A receiver as defined in claim 2 wherein said phase-locking means has inputs connected to outputs of three adjoining stages in the middle of said shift register.

4. A receiver as defined in claim 1, 2 or 3 wherein said logic circuitry comprises a pair of coincidence circuits with inputs respectively connected to two interleaved groups of stages of said shift register.

5. A receiver as defined in claim 4 wherein said decision means comprises two majority-logic networks with inputs respectively connected to said interleaved groups.

6. A receiver as defined in claim 4 wherein said logic circuitry further comprises a first counter stepped by said timing means for establishing a period equal to a dibit cycle, storage means controlled by said first counter for accumulating occurrences of said characteristic bit groupings with the periodicity of said dibit cycles, and a second counter synchronized with said first counter for periodically emitting said reading command, said second counter being resettable by an alignment signal from said storage means upon the number of said occurrences reaching a predetermined value.

7. A receiver as defined in claim 6 wherein said coincidence circuits are Exclusive-OR gates with inverting outputs connected to respective inputs of an AND gate, said storage means being connected to an output of said AND gate.

8. A receiver as defined in claim 6 wherein said storage means comprises an incrementer stepped by said timing pulses and a memory connected in a feedback loop to said incrementer, said memory being addressable by said first counter and being resettable jointly with said second counter by said alignment signal emitted by said incrementer.

9. A receiver as defined in claim 6, further comprising a presetting circuit connected to said generator for imparting a predetermined phase shift to said reference square wave upon a change in the frequency of an incoming carrier wave, said presetting circuit being connected to said storage means for receiving said alignment signal therefrom.

10. A receiver as defined in claim 4 wherein said shift register has 16 stages, one of said interleaved groups being the first, fifth, ninth and thirteenth stages, the other of said interleaved groups being the third, seventh, eleventh and fifteenth stages.

11. A receiver as defined in claim 1, 2 or 3 wherein said phase-demodulation means comprises an Exclusive-OR gate.

12. A receiver as defined in claim 11 wherein said squarer and said generator have enabling inputs connected to said source for sampling said incoming carrier wave and said reference square wave under the control of said timing pulses upstream of said Exclusive-OR gate.

* * * * *